(12) United States Patent
Mikawa et al.

(10) Patent No.: US 9,423,677 B2
(45) Date of Patent: Aug. 23, 2016

(54) COOLING STRUCTURE, IMAGE PROJECTION APPARATUS, ELECTRONIC DEVICE, AND COOLING DEVICE

(71) Applicants: Akihisa Mikawa, Kanagawa (JP); Tetsuya Fujioka, Kanagawa (JP); Hideo Kanai, Tokyo (JP); Masamichi Yamada, Kanagawa (JP); Yasunari Mikutsu, Tokyo (JP); Satoshi Tsuchiya, Kanagawa (JP); Naoyuki Ishikawa, Kanagawa (JP)

(72) Inventors: Akihisa Mikawa, Kanagawa (JP); Tetsuya Fujioka, Kanagawa (JP); Hideo Kanai, Tokyo (JP); Masamichi Yamada, Kanagawa (JP); Yasunari Mikutsu, Tokyo (JP); Satoshi Tsuchiya, Kanagawa (JP); Naoyuki Ishikawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 89 days.

(21) Appl. No.: 14/305,231

(22) Filed: Jun. 16, 2014

(65) Prior Publication Data

US 2014/0375967 A1  Dec. 25, 2014

(30) Foreign Application Priority Data

Jun. 21, 2013  (JP) ................... 2013-131171

(51) Int. Cl.
*G03B 21/16* (2006.01)
*F28D 1/02* (2006.01)
(Continued)

(52) U.S. Cl.
CPC ............. *G03B 21/16* (2013.01); *F28F 3/00* (2013.01); *F28F 13/12* (2013.01); *H04N 9/3144* (2013.01); *F28D 1/024* (2013.01); *G03B 21/008* (2013.01)

(58) Field of Classification Search
CPC .... G03B 21/16; G03B 21/14; H04N 9/3144; H04N 9/3141; F28F 13/12; F28F 3/00; F28F 3/02; F28F 3/04; F28D 1/0233; F28D 1/024; F28D 1/0461; F28D 1/03
USPC ......... 353/52, 57, 58, 60, 61; 165/275, 80.2, 165/80.3; 361/676, 679.46, 679.47, 688, 361/697
See application file for complete search history.

(56) References Cited

U.S. PATENT DOCUMENTS 7,150,313 B2 * 12/2006 Huang ................. H01L 23/467
                                                   165/121
7,990,719 B2 *  8/2011 Chen .................. H05K 7/20154
                                                   165/185

(Continued)

FOREIGN PATENT DOCUMENTS

JP   2001-119183   4/2001
JP   3700571       7/2005

(Continued)

OTHER PUBLICATIONS

U.S. Appl. No. 13/305,343, filed Jun. 16, 2014.

(Continued)

*Primary Examiner* — William C Dowling
*Assistant Examiner* — Ryan Howard
(74) *Attorney, Agent, or Firm* — Oblon, McClelland, Maier & Neustadt, L.L.P.

(57) ABSTRACT

A cooling structure includes: a heat releasing unit configured to include a plurality of fins and to release heat by contacting a first cooling target; and an air blowing unit configured to blow air to the heat releasing unit, wherein the heat releasing unit includes a first region and a second region in which intervals of the fins are smaller than those of the first region, and a second cooling target that is different from the first cooling target is positioned downstream relative to the first region in a flow path of the air, and the air that has passed through the first region blows on the second cooling target.

8 Claims, 16 Drawing Sheets

(51) Int. Cl.
    *F28F 3/00*      (2006.01)
    *F28F 13/12*     (2006.01)
    *H04N 9/31*      (2006.01)
    *G03B 21/00*     (2006.01)

(56)            References Cited

U.S. PATENT DOCUMENTS

| 2005/0012905 A1 | 1/2005 | Morinaga |
| 2005/0081556 A1* | 4/2005 | Kim .................... F24F 3/16 62/411 |
| 2011/0267777 A1 | 11/2011 | Oike et al. |
| 2013/0114054 A1 | 5/2013 | Ishikawa et al. |
| 2013/0242270 A1 | 9/2013 | Tsukioka et al. |

FOREIGN PATENT DOCUMENTS

| JP | 2005-243925 | 9/2005 |
| JP | 2006-147618 | 6/2006 |
| JP | 3834819 | 8/2006 |
| JP | 2006-343565 | 12/2006 |
| JP | 2008-134432 | 6/2008 |
| JP | 2011-233849 | 11/2011 |
| JP | 4901595 | 1/2012 |
| JP | 4927923 | 2/2012 |
| JP | 2013-097342 | 5/2013 |
| JP | 2013-195668 | 9/2013 |
| WO | WO 2011/111203 A1 | 9/2011 |

OTHER PUBLICATIONS

Office Action issued in Japanese Patent Application No. 2013-242359 mailed Dec. 17, 2013.

Office Action issued in Japanese Patent Application No. 2013-242359 mailed Mar. 4, 2014.

* cited by examiner ns to the heat source to expand a heat releasing area, and of blowing cooling air onto a heat releasing unit has been known. As a technique of further improving the cooling efficiency, for example, fabricating the heat sink with a highly thermal conductive material has been practiced. By fabricating the heat sink with highly thermal conductive material, it becomes possible to spread the heat transmitted from a contact unit in contact with the heat source uniformly to the entire heat sink. As a result, the heat releasing area can be enlarged, and therefore, the heat source can be cooled efficiently.

COOLING STRUCTURE, IMAGE PROJECTION APPARATUS, ELECTRONIC DEVICE, AND COOLING DEVICE

CROSS-REFERENCE TO RELATED APPLICATIONS

The present application claims priority to and incorporates by reference the entire contents of Japanese Patent Application No. 2013-131171 filed in Japan on Jun. 21, 2013.

BACKGROUND OF THE INVENTION

1. Field of the Invention

The present invention relates to a cooling structure, an image projection apparatus, an electronic device, and a cooling device.

2. Description of the Related Art

As a technique of cooling a heat source, a method of putting a heat sink to the heat source to expand a heat releasing area, and of blowing cooling air onto a heat releasing unit has been known. As a technique of further improving the cooling efficiency, for example, fabricating the heat sink with a highly thermal conductive material has been practiced. By fabricating the heat sink with highly thermal conductive material, it becomes possible to spread the heat transmitted from a contact unit in contact with the heat source uniformly to the entire heat sink. As a result, the heat releasing area can be enlarged, and therefore, the heat source can be cooled efficiently.

Moreover, enlarging the contact area of cooling air and the heat sink is also effective. The heat sink heated by receiving heat from the heat source is cooled at a portion that contacts with cooling air. Therefore, it becomes possible to improve the cooling efficiency by expanding an area that contacts with cooling air. Moreover, a method of arranging fins on a heat sink has been known as a method of expanding the contact area. By arranging fins in a small pitch and blowing cooling air between respective pitches, a contact area that contacts with the cooling air is expanded, and thus the cooling efficiency is improved.

Furthermore, a forcible cooling method of cooling the heat sink using a fan has also been adopted. Cooling performance is dependent on a wind velocity of air that passes through between the pitches of the fins. Therefore, to improve the cooling performance, it is necessary to increase the speed of the air that passes through between pitches, and a higher cooling effect can be acquired with the forcible air cooling rather than air cooling without blower. As a forcible air cooling, a method of using a fan is common, and especially a cooling structure in which a sirocco fan having high static pressure is arranged so as to oppose to the fins, and air blown out from the sirocco fan blows the fins of the heat sink directly is considered common (Japanese Laid-open Patent Publication No. 2008-134432, Japanese Patent No. 4901595, Japanese Patent 4927923).

However, in the above conventional cooling method, when the cooling efficiency is to be improved structurally, it is required to enlarge a surface area of the heat sink, or to prepare a more powerful large fan to improve the cooling efficiency, and there has been a problem that the structure increases in size. Therefore, in any case, the structure increases in size and weight, and there has been a problem that it is difficult to be equipped inside compact and light-weight electric devices.

Moreover, in the method of arranging the fins in a small pitch, because the cooling air passes through between the pitches of the fins, air resistance increases if the fins are arranged in a small pitch. Because the cooling performance is dependent on an amount of air, if the air resistance increases, the amount of the air that passes through the fins decreases. Therefore, there has been a problem that it is difficult to use the air that has passed through the fins, for cooling other components. That is, when forming a structure in which a fan, a heat releasing unit, and other cooling targets are aligned in series in the above order to cool not only the heat releasing unit but also the other cooling targets at the same time using cooling air blown out from the fan, if the fins are arranged in a small pitch, the cooling performance for the heat releasing unit is enhanced but it is difficult to cool the cooling targets positioned downstream relative to the heat releasing unit.

Therefore, in the conventional method of improving the cooling performance by arranging fins in a small pitch, a structure in which the target to be cooled by a fan is only a heat releasing unit is common, and even if it is structured such that the other components are cooled using air that has been used to cool the heat releasing unit, the cooling performance therefor cannot be expected. Moreover, when fins are designed to have a complicated shape, there has been a problem that cost of the fins increases. Therefore, ideally, such a method of expanding the surface area of the heat releasing unit with a simple shape is demanded.

Therefore, there is a need to offer a cooling structure that enables to enhance the cooling performance of a heat releasing unit, and to cool, at the same time, a cooling target positioned downstream relative to the heat releasing unit using air that has been used to cool the heat releasing unit.

SUMMARY OF THE INVENTION

It is an object of the present invention to at least partially solve the problems in the conventional technology.

According to an aspect of the present invention, provided is a cooling structure including: a heat releasing unit configured to include a plurality of fins and to release heat by contacting a first cooling target; and an air blowing unit configured to blow air to the heat releasing unit, wherein the heat releasing unit includes a first region and a second region in which intervals of the fins are smaller than those of the first region, and a second cooling target that is different from the first cooling target is positioned downstream relative to the first region in a flow path of the air, and the air that has passed through the first region blows on the second cooling target.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
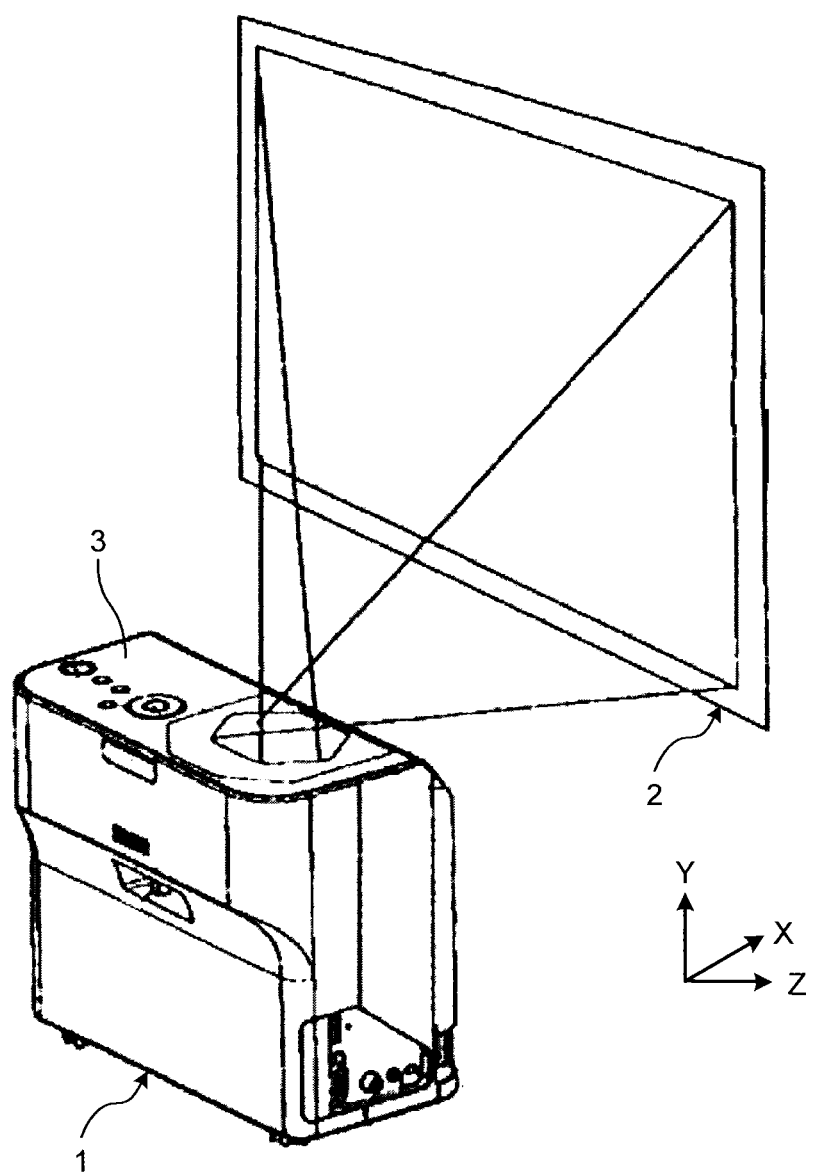
FIG. 1 is a perspective view showing a use mode of an image projection apparatus of an embodiment.

An embodiment of the present invention is explained below with reference to the drawings. FIG. 1 is an appearance perspective view showing an image projection apparatus 1 according to the present embodiment when viewed from an angle. An image projection apparatus 1 generates an image on the basis of image data input from a personal computer, a video camera, and the like, and projects the image on a screen 2 or the like that is a projected surface. These days, achievement of higher resolution of a liquid crystal panel, improvement in brightness with high efficiency of a light-source lamp, price reduction, and the like of a liquid crystal projector widely known as the image projection apparatus 1 are increasingly being advanced. Moreover, compact lightweight image projection apparatuses using a digital micro-mirror device (DMD) have become widespread, and these image projection apparatuses have been increasingly used at home as well as at an office or a school. Particularly, front type projectors have been improved in portability, and have been increasingly used also in small meetings with several people.

Figure 2:
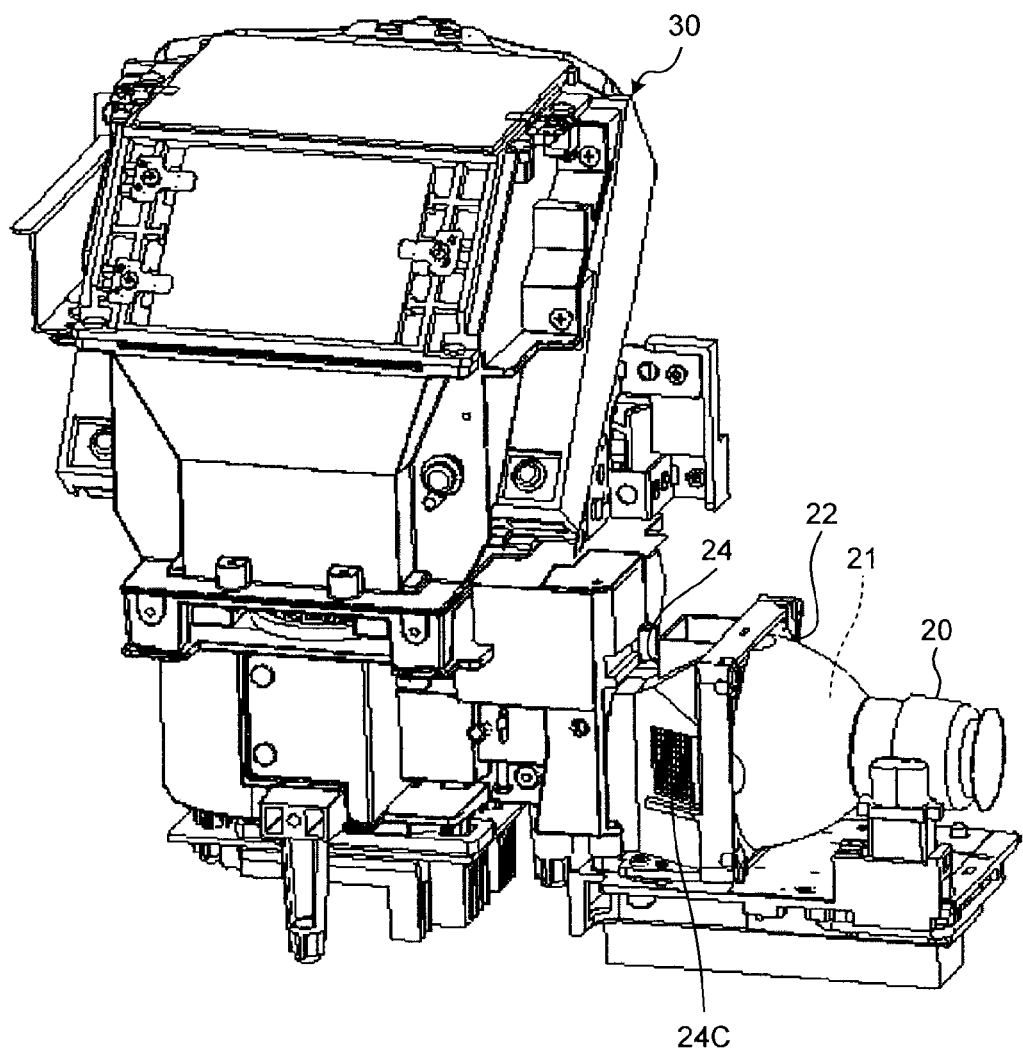
FIG. 2 is a perspective view showing an optical engine unit and a light source device of the embodiment.

FIG. 2 is a perspective view showing a state in which an external layer cover 3 of the image projection apparatus 1 shown in FIG. 1 is removed. As shown in FIG. 2, the image projection apparatus 1 is roughly divided into an optical engine unit 30 and a light source device 20. The light source device 20 controls a light source such as a high-pressure mercury vapor lamp, for example, and supplies white light required for projection of an image to the optical engine unit 30.

The light source device 20 has a light source bracket 22 that is a holding member to hold a light source 21, and the light source 21 such as a halogen lamp, a metal halide lamp, and a high-pressure mercury vapor lamp is mounted at an upper portion of the light source bracket 22.

Moreover, at a light emitting side of the light source 21 at the upper portion of the light source bracket 22, a holder 24 by which an unillustrated reflector and the like are held is fixed with a screw. At a surface of the holder 24 on a side opposite to the side of the light source 21, an emission window 23 (refer to FIG. 3) is arranged. Light emitted from the light source 21 is condensed at the emission window 23 by the unillustrated reflector held by the holder 24 to be emitted from the emission window 23.

Moreover, a light-source intake opening through which air for cooling the light source 21 flows in is arranged on a side surface of the holder 24, and a light-source exhaust opening through which air heated by heat of the light source 21 is exhausted is arranged on an upper surface of the holder 24.

Figure 3:
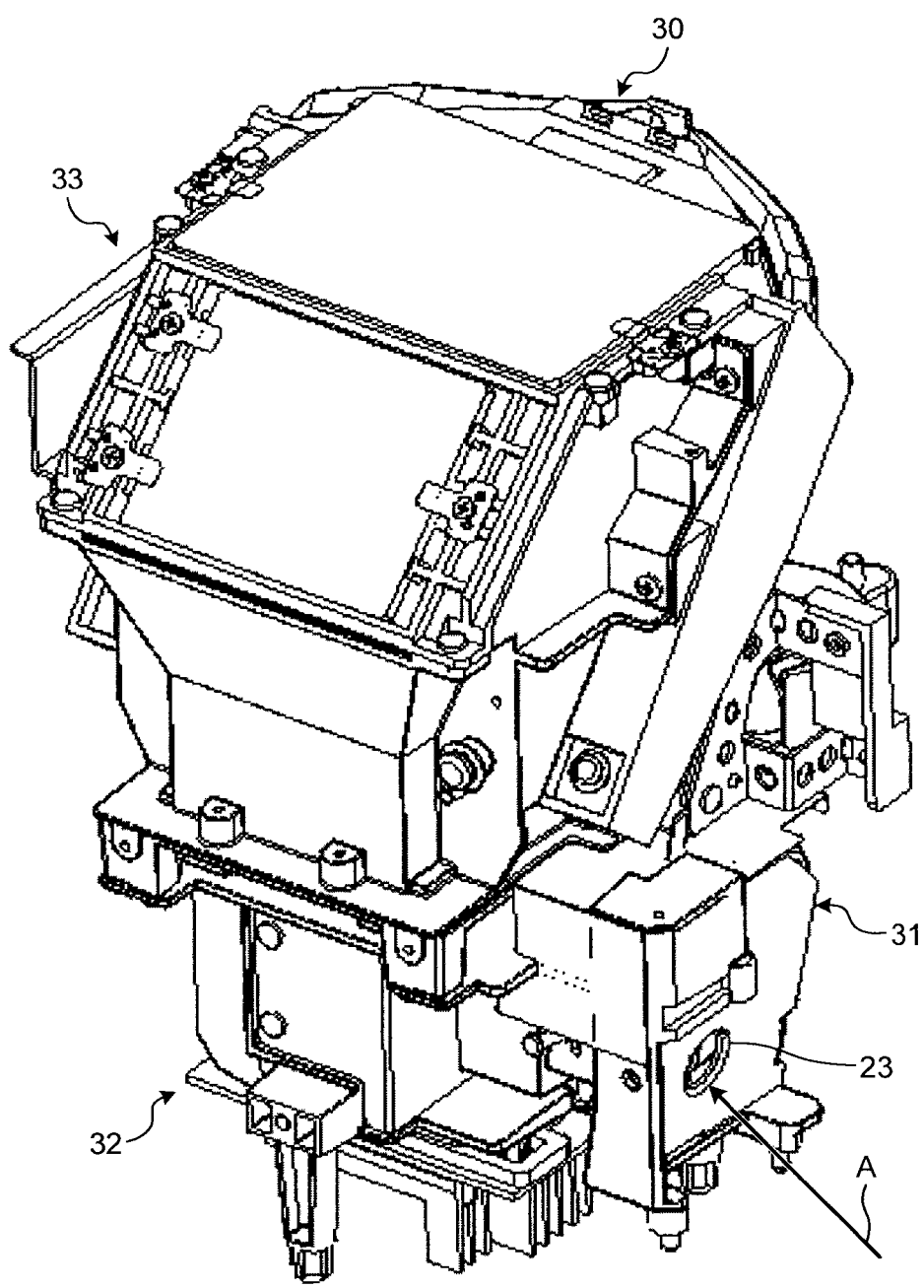
FIG. 3 is a perspective view showing the optical engine unit of the embodiment.

An optical engine unit 30 performs control of processing input image data to project, using the light supplied from the light source device 20. FIG. 3 is a perspective view showing a detailed structure of the optical engine unit 30. The optical engine unit 30 includes an illumination optical unit 31, a projection optical unit 33, and an image processing unit 32. The white light from the light source device 20 described above is first irradiated to the illumination optical unit 31. The illumination optical unit 31 disperses the white light from the light source device 20 to respective RGB components to guide to the image processing unit 32. The image processing unit 32 performs an image forming according to a modulation signal, and generates an image to be projected from the input image data. The projection optical unit 33 projects the image generated by the image processing unit 32 on the projected surface in an enlarged manner.

Figure 4:
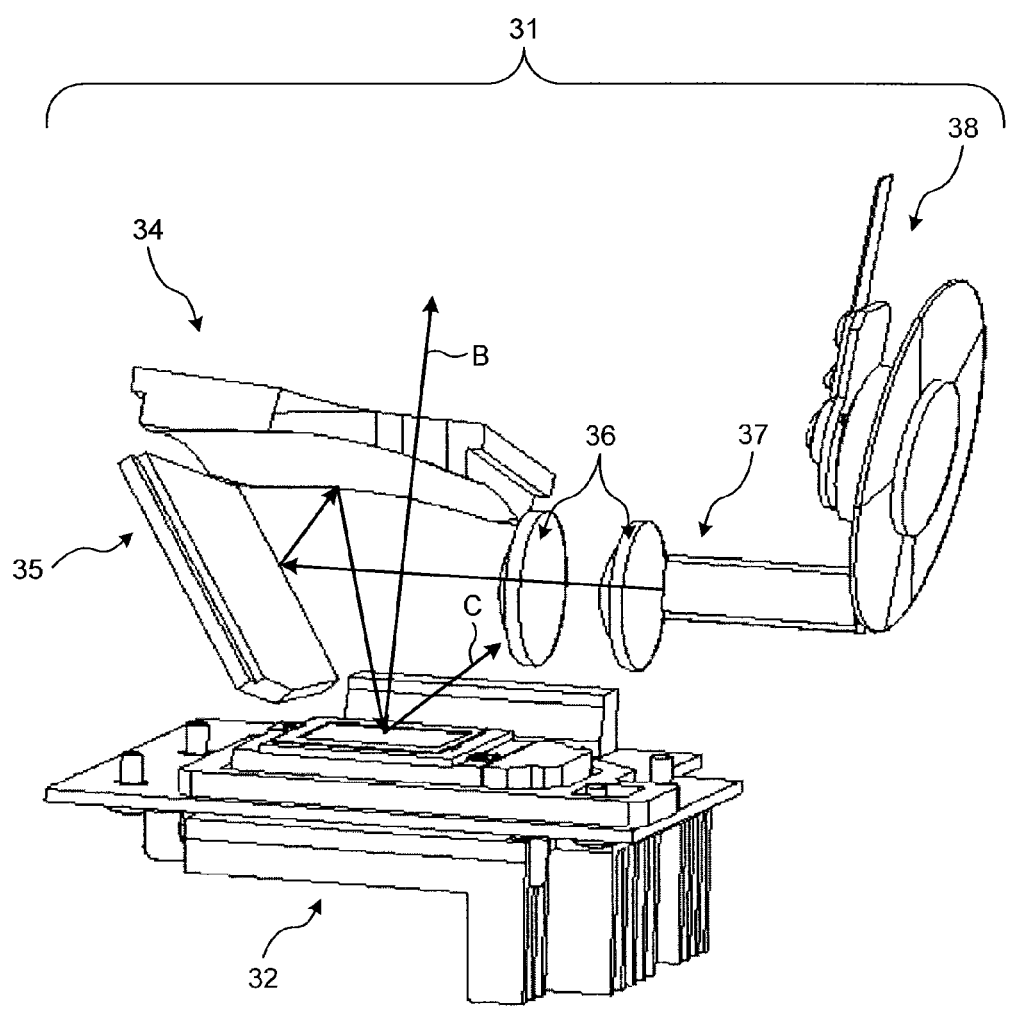
FIG. 4 is a perspective view showing an illumination optical unit and an image processing unit of the embodiment.

FIG. 4 is a structural arrangement plan of the illumination optical unit 31 and the image processing unit 32. The illumination optical unit 31 includes a color wheel 38, a light tunnel 37, a relay lens 36, a cylinder mirror 35, and a concave-convex mirror 34. The color wheel 38 converts the white light emitted from the light source device 20 described above into light in which the respective colors of RGB are repeated in every unit time by a color filter in a disc shape. The light tunnel 37 is formed by putting sheet glasses together into a cylindrical shape, and guides the light emitted from the color wheel 38. The relay lens 36 is formed with two lenses combined, and condenses the light emitted from the light tunnel 37, while correcting axial chromatic aberration thereof.

The cylinder mirror 35 and the concave-convex mirror 34 reflect the light emitted from the relay lens 36. The reflected light is input to the image processing unit 32, and the image processing unit 32 has an approximately rectangular mirror plane constituted of multiple micro mirrors, and includes a DMD element that processes and reflects projection light so as to form a predetermined image by time sharing operation of the respective micro mirrors based on an image or image data. In the image processing unit 32, light used by the multiple micro mirrors in a time sharing manner on the basis of image data by the DMD element is reflected in the direction of a projection lens 51 indicated by an arrow B in the figure, and light to be discarded is reflected to an off light plate indicated by an arrow C.

Figure 5:
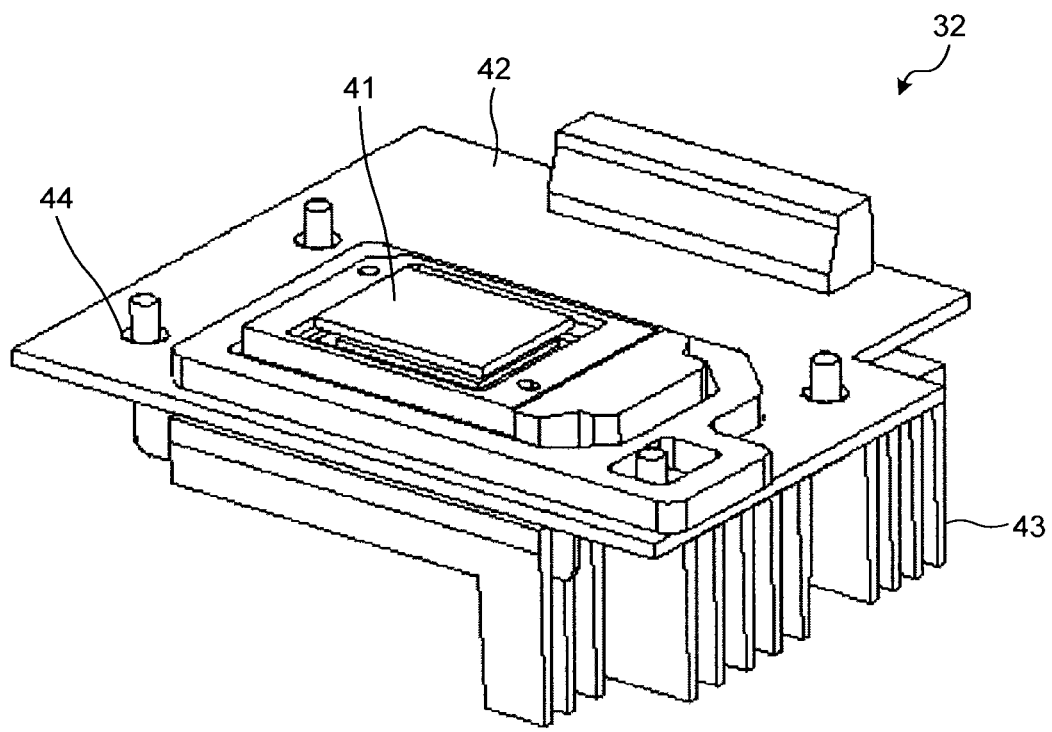
FIG. 5 is a perspective view showing the image processing unit of the embodiment.
Figure 6:
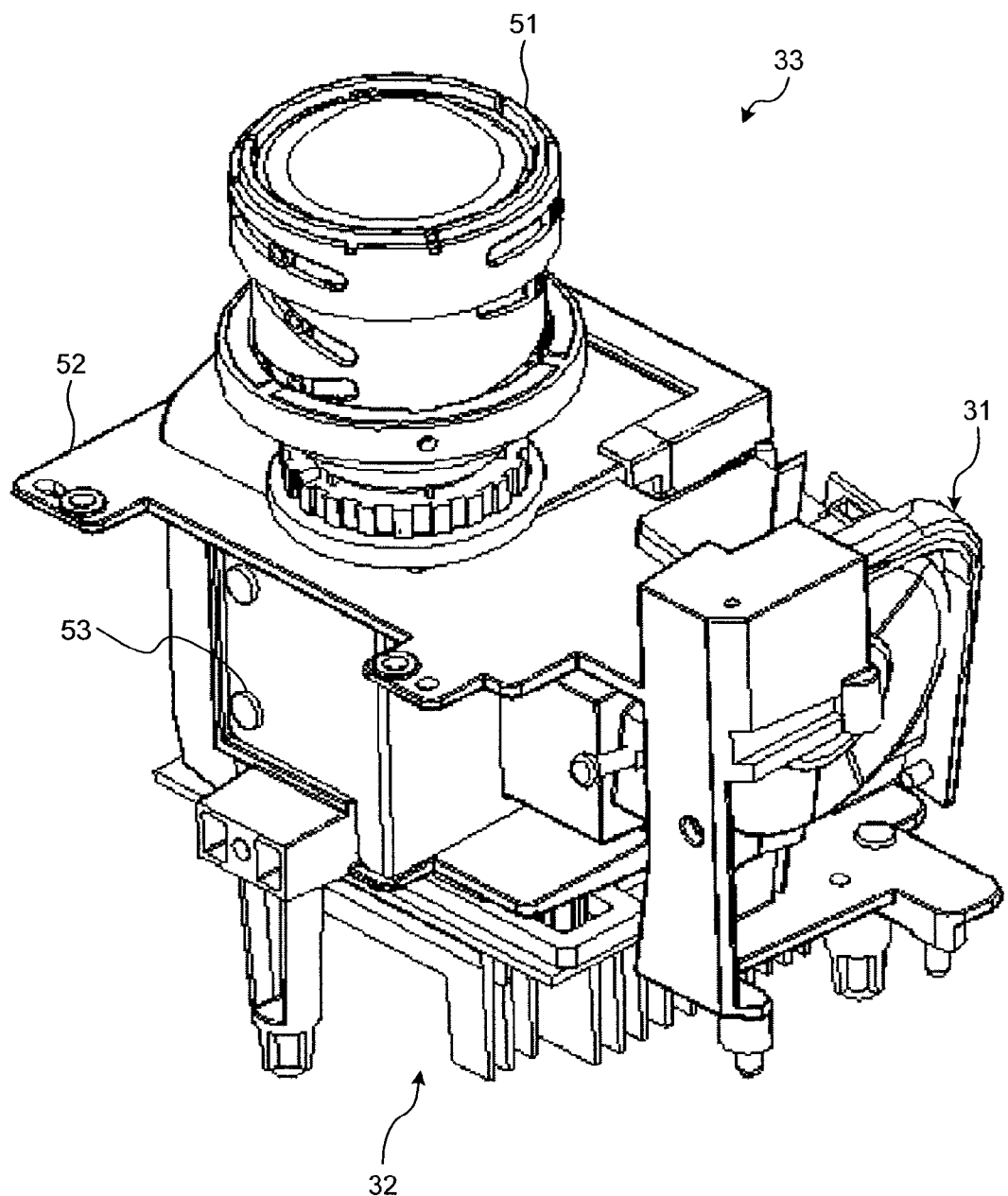
FIG. 6 is a perspective view showing a projection optical unit of the embodiment.

FIG. 5 is a perspective view showing a structure of the image processing unit 32. The image processing unit 32 includes the DMD element 41, a DMD printed-circuit board 42 that controls the DMD element 41, a heat sink 43 that cools the DMD element 41, and a fixing plate 44 that pushes the heat sink 43 to the DMD element 41. In the present embodiment, the heat sink 43 corresponds to the heat releasing unit. The heat sink 43 contacts the DMD element 41 being a first cooling target, to release heat of the DMD element 41. Moreover, FIG. 6 is a perspective view showing a detailed structure of the projection optical unit 33. Light that has passed through the image processing unit 32 is reflected to the projection lens 51 shown in FIG. 6, and light to be discarded is reflected to an off light plate 53 shown in FIG. 6.

Figure 7:
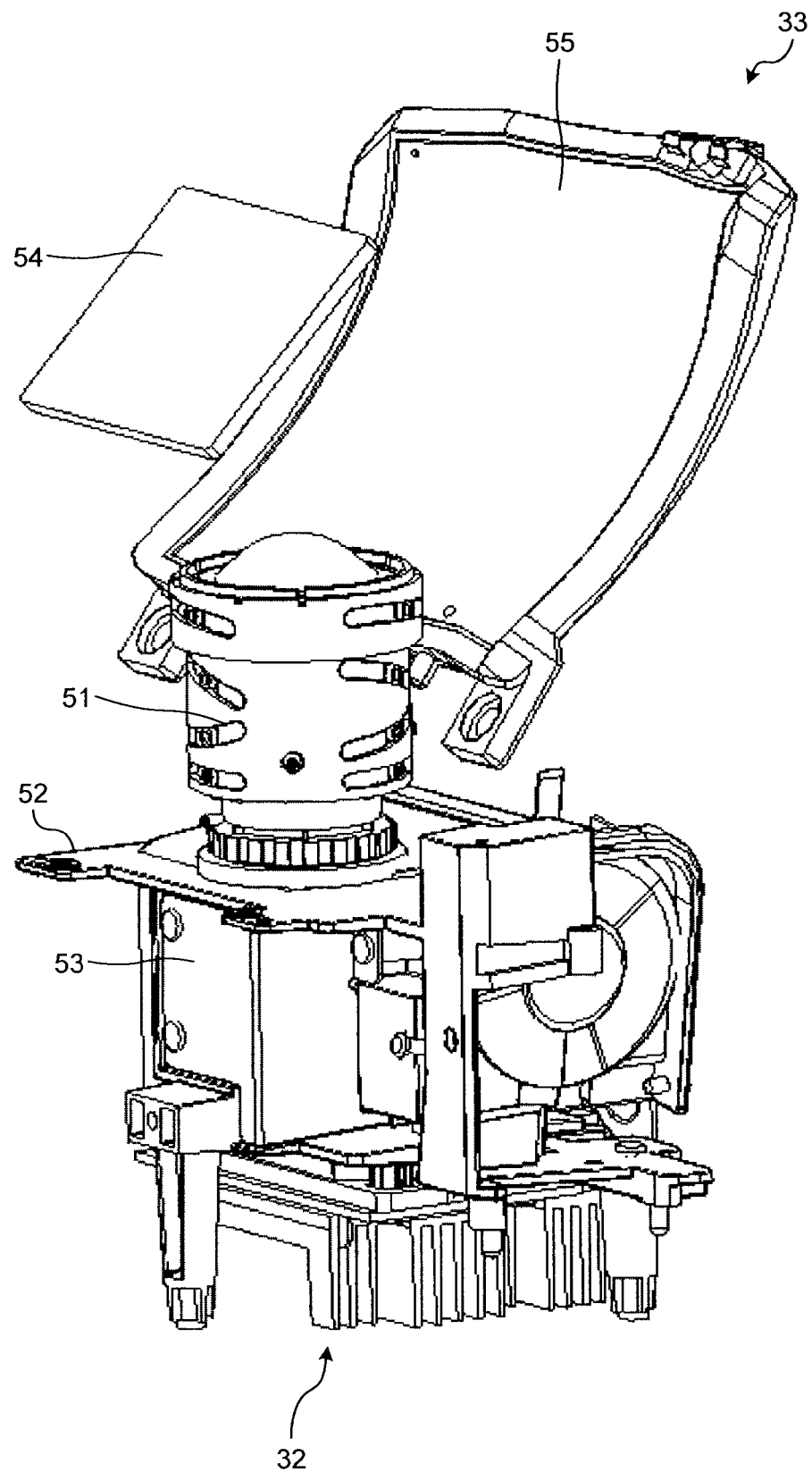
FIG. 7 is a perspective view showing the projection optical unit of the embodiment.
Figure 8:
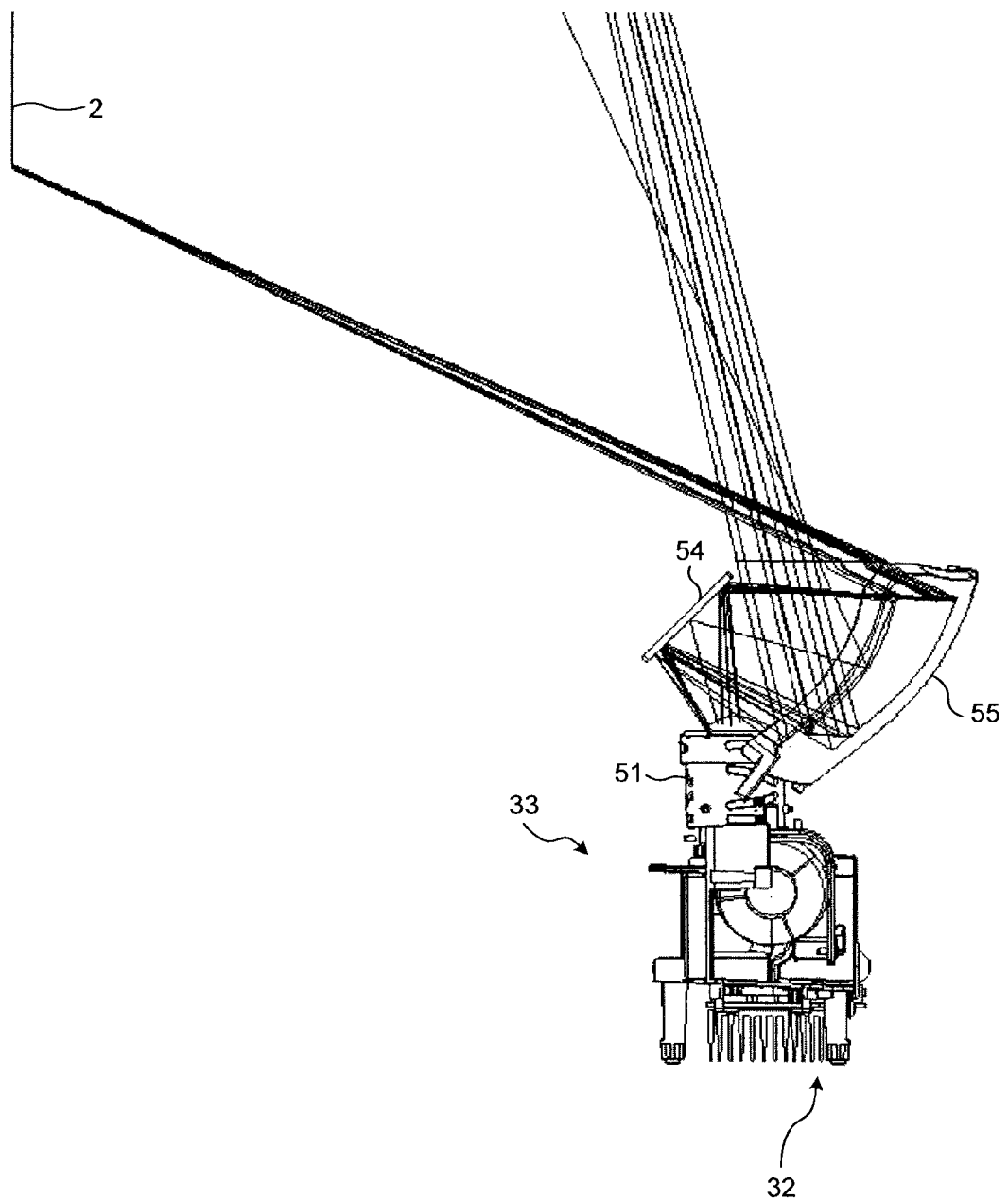
FIG. 8 is a side view showing the projection optical unit of the embodiment.

FIG. 7 and FIG. 8 are a perspective view and a side view showing a structure of the projection optical unit 33. An optical path of image light that has passed through the projection lens 51 and has been expanded is folded back by a fold back mirror 54, and is projected on a screen 2 by a free-curved mirror 55 in an enlarged manner. By the above structure, the optical engine unit 30 can be arranged adjacent to the screen 2, and can be designed in an upright form in which an optical axis path is vertical so as to have a small installation area and to be sterically compact.

Figure 9:
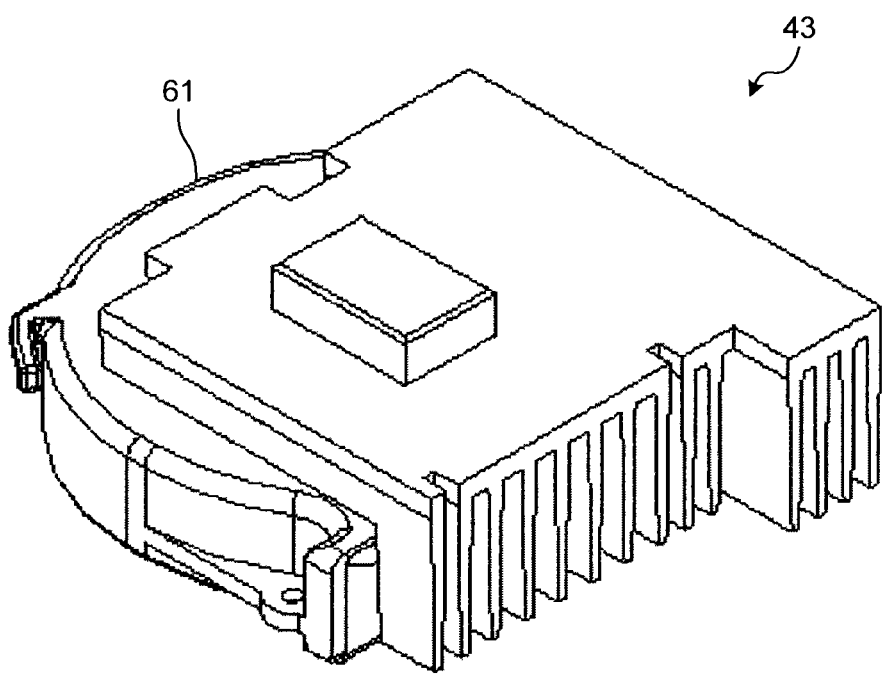
FIG. 9 is a perspective view showing a structure of a heat sink of the embodiment.

FIG. 9 is a diagram showing a structure of the heat sink 43 used in the present embodiment. In the present embodiment, this heat sink 43 implements a cooling structure to cool two units of devices, the image processing unit 32 and the light source device 20. To the heat sink 43, a sirocco fan 61 is arranged thereinside (on a bottom-surface side thereof). The sirocco fan 61 corresponds to an air blowing unit that takes outside air to blow into the heat sink 43. The sirocco fan 61 has a structure in which a cylinder with many small fins facing forward and an air rectifier are combined, and a general kind having the static pressure efficiency of 60% level is used.

Figure 10:
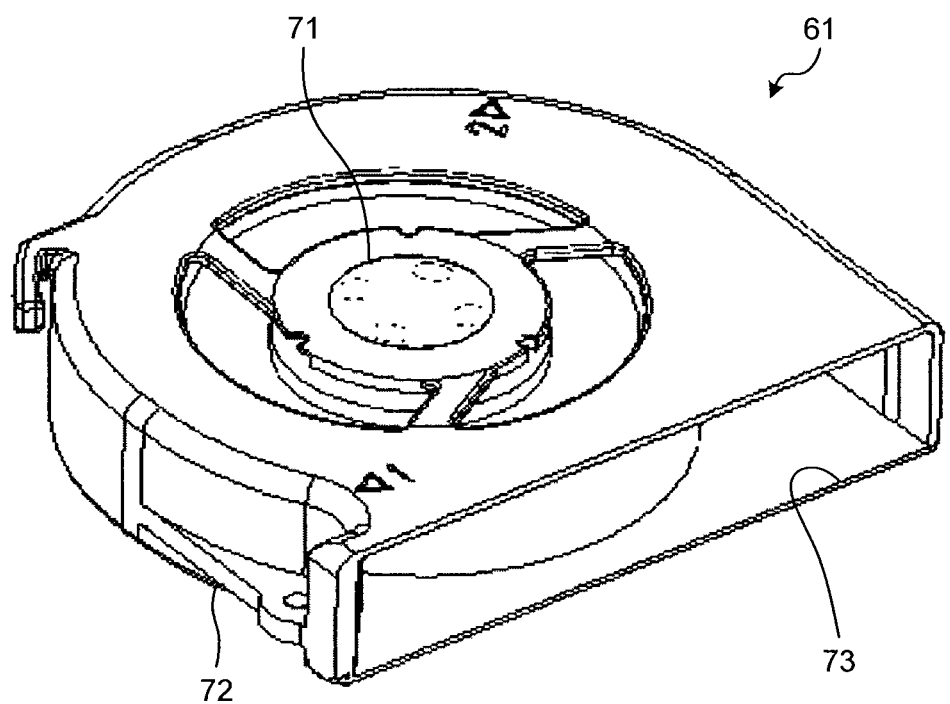
FIG. 10 is a perspective view showing a structure of a sirocco fan of the embodiment.

Furthermore, the sirocco fan 61 has a first intake opening 71, a second intake opening 72, and a blow-out opening 73 as shown in FIG. 10. The second intake opening 72 is arranged on the opposite side of the first intake opening 71, and the sirocco fan 61 is a double-side intake fan. That is, in the present embodiment, the first intake opening 71 is arranged on an upper surface side of the sirocco fan 61 and the second intake opening 72 is arranged on a bottom surface side of the sirocco fan 61. Moreover, in this structure, the sirocco fan 61 in which the blow-out opening 73 is wide, that is, the blow-out opening 73 having width larger than thickness, is used. This is to further enhance the cooling efficiency. The sirocco fan having the wide blow-out opening 73 can enlarge an area from which cooling air is exhausted, and the contact area between the cooling air and the heat sink 43 can be increased. By thus increasing the contact area between the cooling air and the heat sink 43, the cooling efficiency can be improved.

Figure 11:
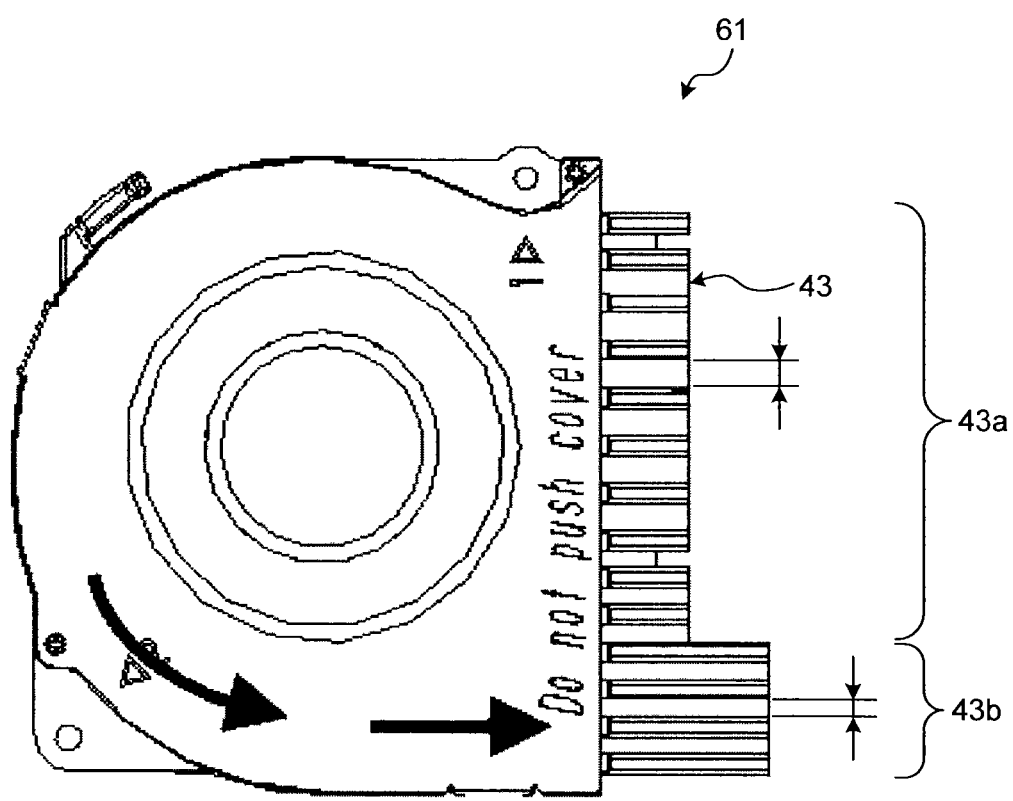
FIG. 11 is a bottom plan view showing the structure of the sirocco fan of the embodiment.

FIG. 11 is a diagram showing a flow of air that is blown out from the sirocco fan 61 viewed from the bottom surface side of the sirocco fan 61. As shown in FIG. 11, the sirocco fan 61 is structured such that a large amount of air concentrates on a side of an end indicated by an arrow among the exhaust openings 73. Therefore, the amount of airflow of the cooling air blown out is not uniform, and a first portion with a small amount of airflow to which air in a predetermined first amount flows and a second portion to which air in a second amount flows that is larger than the first amount can be distinguished.

Among the cooling air generated by the sirocco fan 61, for a second region 43b with a large amount of airflow, the length of the fins of the heat sink 43 is formed long to increase the surface area of fins. As for the pitch of the fins also, it is arranged such that the pitch is small in the second region 43b through which a large amount of cooling air flows, and it is arranged such that the pitch is large in a first region 43a through which a small amount of cooling air flows. The pitch is an interval between respective fins.

With such a structure, the surface area of the heat sink 43 in the second region 43b can be expanded, and the cooling efficiency of the heat sink 43 in the second region 43b through which a large amount of cooling air flows can be improved. On the other hand, in the first region 43a through which a small amount of cooling air passes, it is arranged such that the pitch of the fins is large thereby reducing the air resistance, and the cooling air that has passed through this first region 43a is used for cooling components positioned on a downstream side. That is, cooling of the heat sink 43 is performed in the second region 43b in which the pitch of the fins is small and the length of the fins is long, and cooling of the components on the downstream side is performed in the first region 43a in which the pitch is large.

Figure 12:
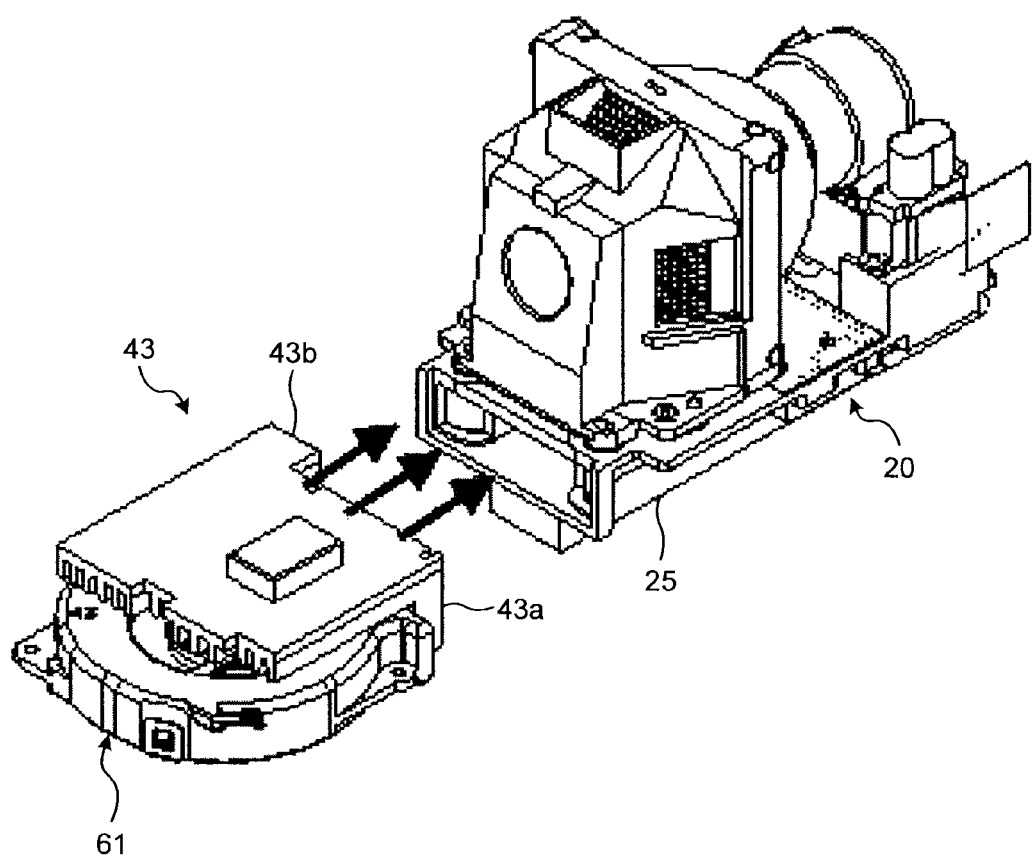
FIG. 12 is a perspective view showing positional relation of the heat sink and the light source device of the embodiment.
Figure 13:
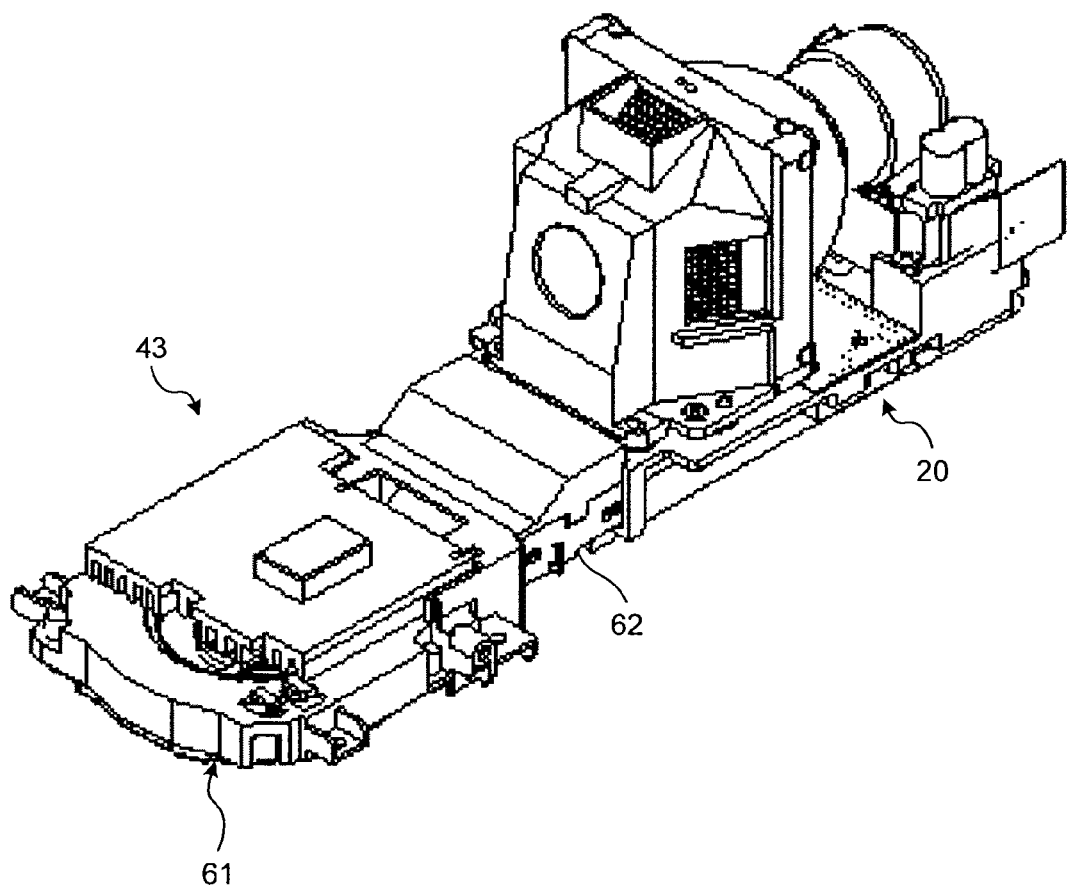
FIG. 13 is a perspective view showing the positional relation of the heat sink and the light source device of the embodiment.

Subsequently, positional relation among the light source device 20 that is a second cooling target positioned on the downstream side in an air flow path in the heat sink 43, the sirocco fan 61, and the heat sink 43 is explained below using a FIG. 12. As shown in FIG. 12, it is structured such that a duct 25 for cooling the light source device 20 is connected linearly from the first region 43a in which the pitch of the fins is large. With such a structure, the cooling air that has passed through the first region 43a enters into the above duct 25 without losing the amount of air, and can cool the light source device 20. In this way, the sirocco fan 61 that is a cooling source for forcible air cooling, the heat sink 43, and the light source device 20 that is the cooling target of the air that has passed through the heat sink 43 are arranged linearly in sequence. With a structure in which the duct 25 for cooling of the light source device 20 is arranged at a position opposing to the first region 43a in which the pitch is large, the light source device 20 can be cooled efficiently in the first region 43a in which the pitch of the fins is large. On the other hand, in the second region 43b in which the pitch of the fins is small, the heat sink 43 can be cooled efficiently. Accordingly, cooling of two components of the heat sink 43 and the light source device 20 can be efficiently performed with a single unit of the sirocco fan 61. As a method of guiding the cooling air that has passed through the first region 43a into the duct 25 of the light source device 20 with smaller loss, it is desirable to newly arrange a duct 62 for a connection as shown in FIG. 13.

Figure 14:
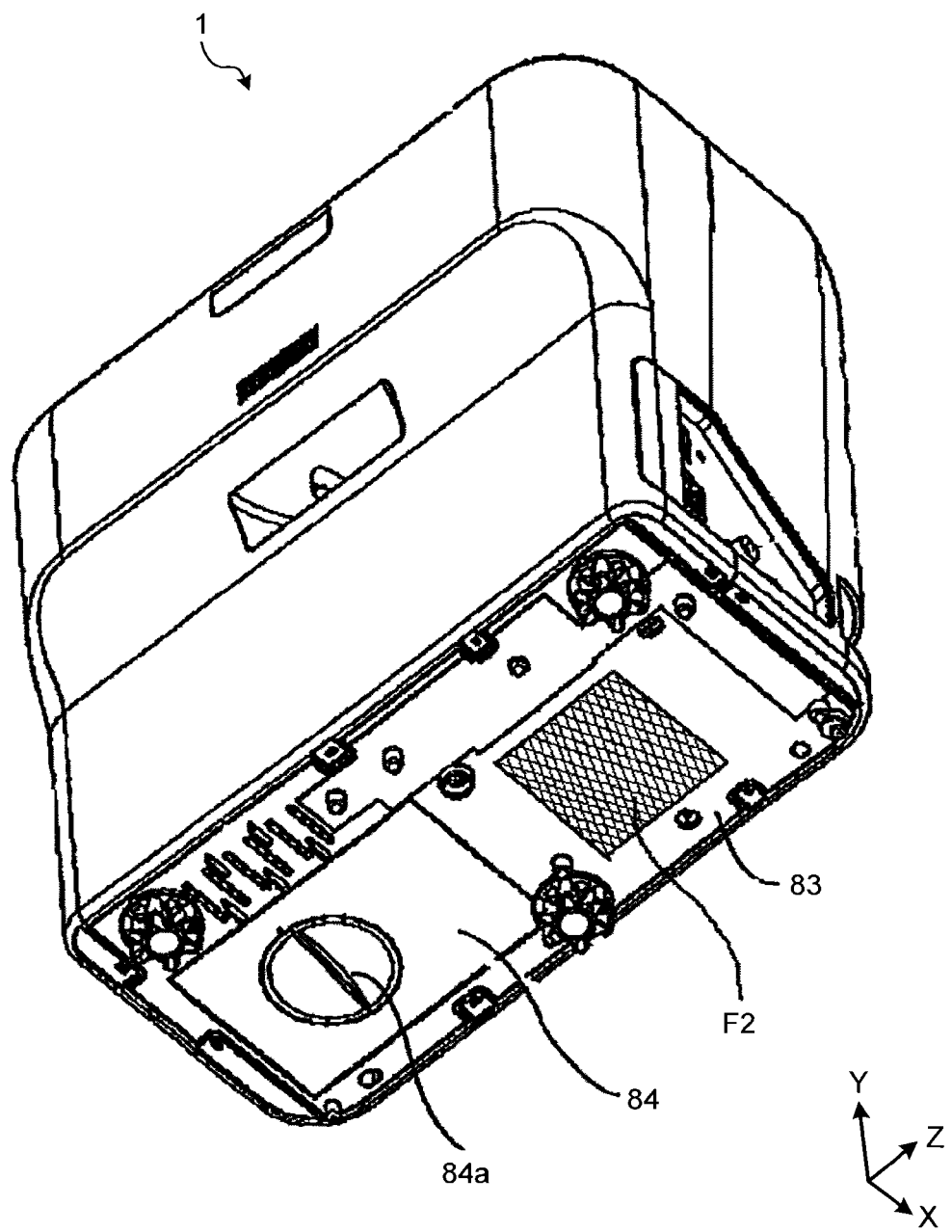
FIG. 14 is a bottom plan view of the image projection device of the embodiment.

Next, a structure of the image projection apparatus 1 itself that takes in such cooling air is explained. FIG. 14 is a perspective view of a mounting surface side of the image projection apparatus 1. As shown in FIG. 14, an opening/closing cover 84 is arranged at a base portion 83 that forms a bottom surface of the image projection apparatus 1. A rotating handle portion 84a is arranged on the opening/closing cover 84. If the rotating handle portion 84a is rotated, the opening/closing cover 84 fixed to a main unit is released, and the opening/closing cover 84 is to be removable from the main unit. Furthermore, an air introducing opening F2 is arranged on a bottom surface of the base portion 83 of the image projection apparatus 1.

Figure 15:
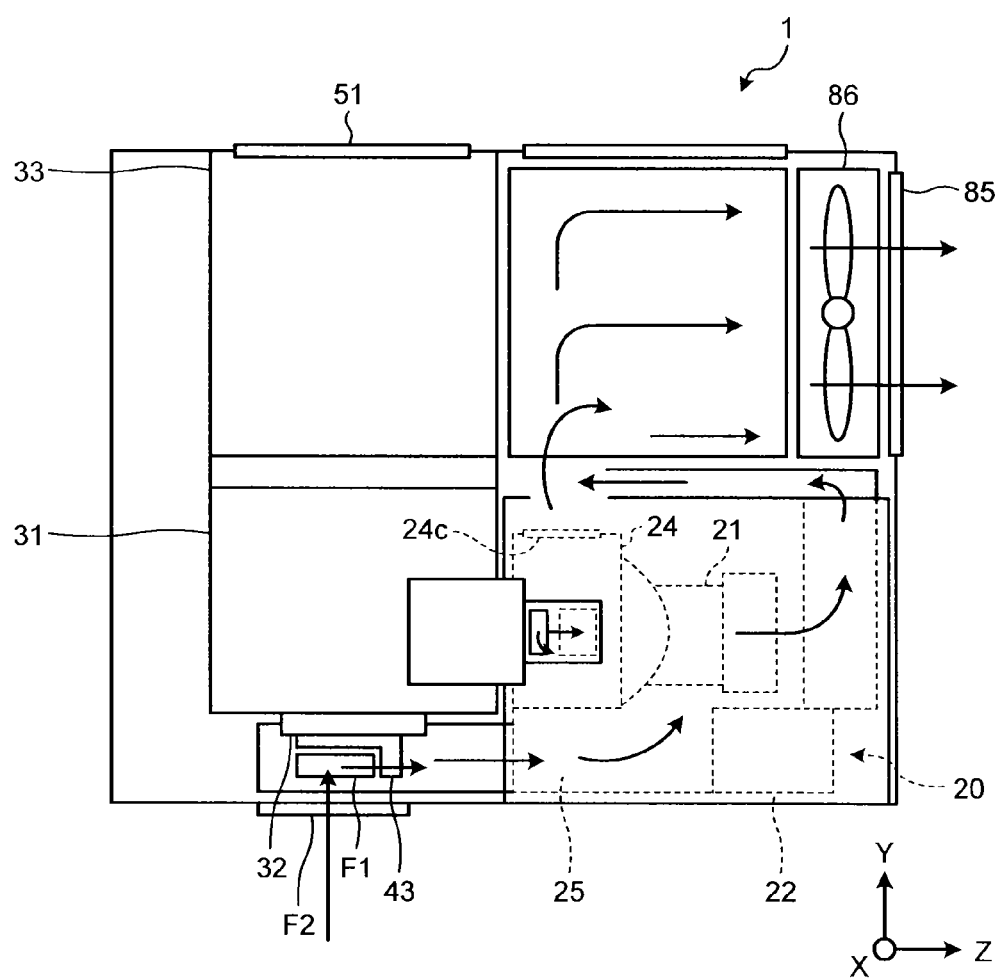
FIG. 15 is a side view of the image projection apparatus of the embodiment.

FIG. 15 is an explanatory diagram of an air flow inside the image projection apparatus 1 of the present embodiment. This diagram shows a view of the image projection apparatus 1 observed from a direction (X-direction) perpendicular to the screen 2. In FIG. 15, arrows indicate directions in which air flows. As shown in FIG. 15, the air introducing opening F2 that opens to take outside air into the image projection apparatus 1 is arranged on one side (lower left part in the figure) of the bottom surface of the image projection apparatus 1, and an exhaust opening 85 that opens to exhaust air inside the image projection apparatus 1 is arranged on the other side (upper right part in the figure) on a side surface of the image projection apparatus 1. Moreover, an intake fan F1 is arranged so as to be opposed to the air introducing opening F2. An exhaust fan 86 is arranged so as to be opposed to the exhaust opening 85.

Figure 16:
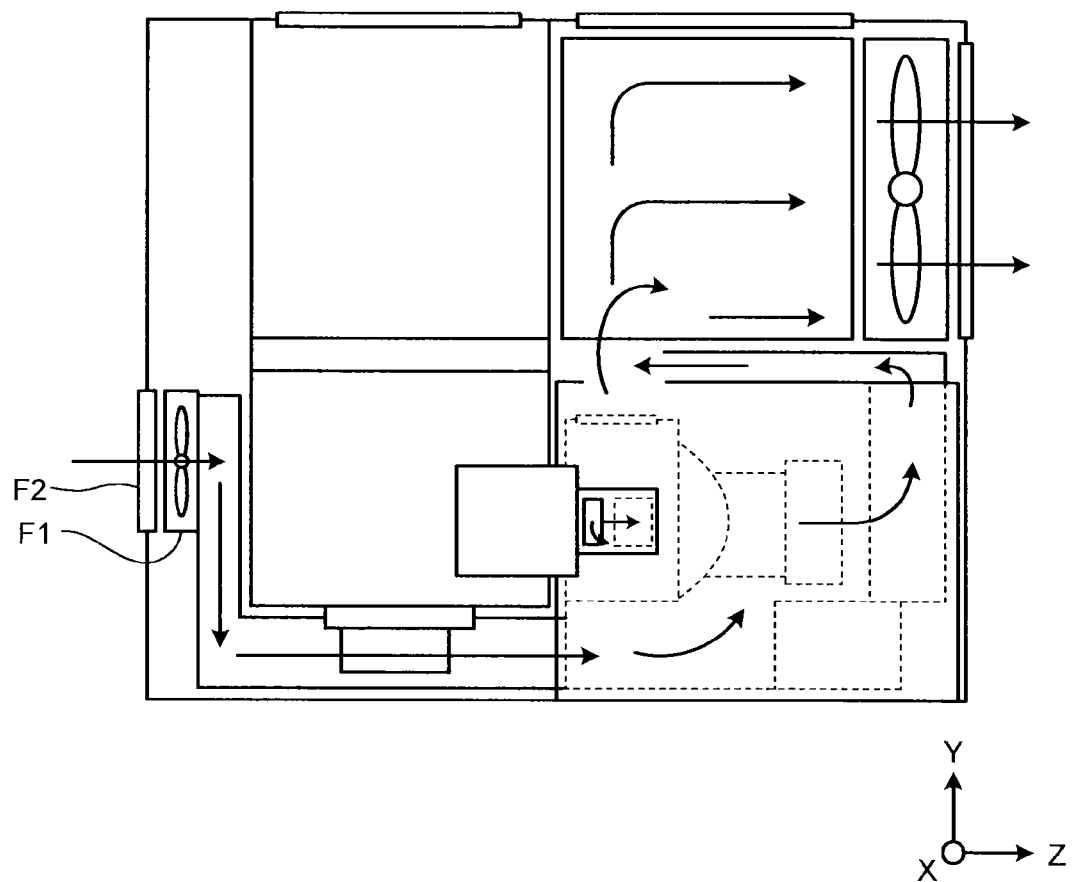
FIG. 16 is a side view of a conventional image projection apparatus.

For example, the intake fan F1 is a sirocco fan, and the exhaust fan 86 is an axial fan. Furthermore, the intake fan F1 and the air introducing opening F2 are arranged adjacent to the heat sink 43. As compared with an air flow in the conventional image projection apparatus shown in FIG. 16, the air introducing opening F2 and the intake fan F1 are arranged on a side surface of a projector, and air reaches a rear part of the light source 21 through a path of a bent duct in the example shown in FIG. 16. On the other hand, in the image projection apparatus 1 of the present embodiment shown in FIG. 15, air taken in by the intake fan F1 from the air introducing opening F2 reaches a rear part of the light source 21 through the straight duct 25 in a shorter way than the conventional technique.

Because the distance from the air introducing opening F2 to the rear part of the light source 21, which is a cooling target, is short, and the duct 25 is straight, the pressure loss on the path from the intake fan F1 to the cooling target can be decreased. Moreover, by using the sirocco fan of double-side intake is as the intake fan F1, near the cooling fins of the heat sink 43, a forced air flow occurs by intake of the sirocco fan on a side of the opposite surface of the air introducing opening F2 at the bottom, and efficient cooling is enabled.

The heat sink 43 with various pitches, which is the embodiment of the present invention, can be fabricated by extrusion molding or die-casting. Accordingly, because the same processing method as that of general heat sinks with uniform pitches can be applied for fabrication, special cost is not required in processing the heat sink 43 shown in the present invention.

As described above, with a configuration in which a cooling target is further arranged downstream relative to the heat sink 43, while arranging the fins in a large pitch, it becomes possible to cool two or more components at the same time with a single fan. As a result, the cooling efficiency is enhanced and it becomes possible to design a cooling device compact.

Moreover, because the heat sink 43 is not in a complicated shape, the cooling effect described above can be obtained without increasing costs. Therefore, the design of a compact and highly efficient cooling structure system is possible even with low cost.

Furthermore, by arranging the air introducing opening F2 and the intake fan F1 on the bottom surface in the image projection apparatus 1, the light source device 20 and the heat sink 43, which are the cooling targets, are positioned adjacently to each other, and the duct for sending air to the light source device 20 can be formed in a straight shape, and therefore, the pressure loss inside the duct is reduced and the cooling efficiency of a light source device 20 improves. As a result, the rotation frequency of the intake fan F1 can be reduced, leading to reduction of noise of the device. Moreover, by arranging the air introducing opening F2 and the intake fan F1 that is adjacent to the opening thereof on the bottom surface of the device, the noise from the intake fan F1 is easier to attenuate before the noise reaches a user's ear compared to a case of intake from a side surface, and the propagation direction of sound is likely to diverge, and therefore this leads also to reduction of noise.

Note that the cooling structure described above can be used also for devices of a cooling target in an electronic device, such as a usual personal computer and an electronic circuit, besides an image projection apparatus.

According to the present invention, it is possible to enhance the cooling performance of a heat releasing unit and to cool a cooling target that is positioned downstream of the heat releasing unit using air that has been used to cool the heat releasing unit.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A cooling structure comprising:
a heat releasing unit including a plurality of fins and to release heat by contacting a first cooling target; and
an air blowing unit to blow air to the heat releasing unit, wherein
the heat releasing unit includes a first region and a second region in which intervals of the fins are smaller than those of the first region,
a second cooling target that is different from the first cooling target is positioned downstream relative to the first region in a flow path of the air, and the air that has passed through the first region blows on the second cooling target,
the air blowing unit includes a first portion at which a predetermined first amount of air blows, and a second portion at which a larger amount of air than the first amount flows, and
the second region is positioned opposed to the second portion, and
the first region is positioned opposed to the first portion.

2. An image projection apparatus comprising:
an image processor configured to generate an image to be projected on the basis of input image data;
a light source device to radiate light;
an illumination optical unit to guide the light from the light source device to the image processor;
a projection optical unit to project the image generated by the image processor on a projection surface; and
a cooling structure to cool the image processor, wherein the cooling structure includes
a heat releasing unit including a plurality of fins and to release heat by contacting the image processor; and
an air blowing unit to blow air to the heat releasing unit, and
the heat releasing unit includes a first region and a second region in which intervals of the fins are smaller than those of the first region, and
the light source device is positioned downstream relative to the first region in a flow path of the air, and the air that has passed through the first region blows on the light source device.

3. The image projection apparatus according to claim 2, further comprising:
an air introducing opening at a base portion constituting a bottom surface of the image projection apparatus and to take air;
an exhaust opening on a side side adjacent to the air introducing opening in a main unit of the image projection apparatus and to exhaust air; and
a duct to guide the air taken in through the air introducing opening to the light source device, the duct being a route of exhaust from the exhaust opening.

4. An electronic device that includes a cooling structure to cool a first cooling target and a second cooling target, wherein the cooling structure includes
a heat releasing unit including a plurality of fins and to release heat by contacting a cooling target; and
an air blowing unit to blow air to the heat releasing unit, and
the heat releasing unit includes a first region and a second region in which intervals of the fins are smaller than those of the first region,
the second cooling target that is different from the first cooling target is positioned downstream relative to the first region in a flow path of the air, and the air that has passed through the first region blows on the second cooling target,
the air blowing unit includes a first portion at which a predetermined first amount of air blows, and a second portion at which a larger amount of air than the first amount flows, and
the second region is positioned opposed to the second portion, and
the first region is positioned opposed to the first portion.

5. A cooling device comprising:
a heat sink including a plurality of fins that have a first region and a second region in which intervals of the fins are smaller than those of the first region; and
a sirocco fan to blow air to the heat sink, and disposed so that an amount of the air flowing to the second region becomes larger than an amount of the air flowing to the first region; wherein
a length of the fins in the second region is longer than a length of the fins in the first region in a direction along flow of the air.

6. A cooling device according to claim 5, wherein end positions of each of the fins on upstream side in the direction along the flow of the air are arranged in line shape.

7. An electronic device comprising:
a cooling target;
a heat sink on the cooling target, and including a plurality of fins that have a first region and a second region in which intervals of the fins are smaller than those of the first region; and
a sirocco fan to blow air to the heat sink, and disposed so that an amount of the air flowing to the second region becomes larger than an amount of the air flowing to the first region,
wherein a length of the fins in the second region is longer than a length of the fins in the first region in a direction along flow of the air.

8. An electronic device according to claim 7, wherein end positions of each of the fins on upstream side in the direction along the flow of the air are disposed along a line.

* * * * *